Figure 1:
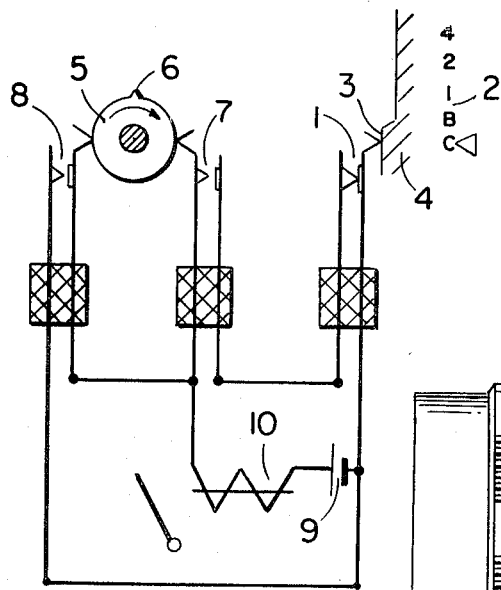

United States Patent
Alfredsson et al.

[15] 3,648,588
[45] Mar. 14, 1972

[54] MEANS FOR GUIDING THE SHUTTER IN A CAMERA EQUIPPED WITH A FOCAL PLANE SHUTTER AND POSSIBLY ALSO A CENTRAL SHUTTER

[72] Inventors: Alf Ingvar Alfredsson, Sävedalen; Lennart Gunnar Oskar Dahlgren, Västra Rölunda, both of Sweden

[73] Assignee: Fritz Victor Hasselblad, Goteborg, Sweden

[22] Filed: Jan. 2, 1970

[21] Appl. No.: 289

[30] Foreign Application Priority Data

June 12, 1969 Sweden..................................8392/69

[52] U.S. Cl. ................................................95/53 R, 95/42
[51] Int. Cl. ..............................................................G03b 9/08
[58] Field of Search.................95/42, 53 R, 55, 56, 57, 12.5

[56] References Cited

UNITED STATES PATENTS 2,242,124  5/1941  Hineline ...................................95/57
2,992,602  7/1961  Heden ......................................95/42

Primary Examiner—Joseph F. Peters, Jr.
Attorney—McGlew and Toren

[57] ABSTRACT

Means in cameras provided with a focal plane shutter and if desired a central shutter, for providing early or delayed release of respective shutters in relation to each other in dependence of the conditions under which an exposure is made, the means including two electrical circuits for early and delayed release respectively of the focal plane shutter, contacts embodied in the circuits and closed at a time difference corresponding to said early or delayed release of the focal plane shutter, movement transmitting means which actuates the contact of one circuit either directly or through the intermediary of coacting members to effect early release of the shutter and cam means located at an extra position "C," on the shutter speed selection means of the camera, which actuates the contact of the other circuit for effecting delayed release of the focal plane shutter.

14 Claims, 3 Drawing Figures

Patented March 14, 1972

3,648,588

INVENTORS
Alf Ingvar Alfredsson
Lennart Gunnar Oskar Dahlgren
by
*Meslew & Toren*
ATTORNEYS

MEANS FOR GUIDING THE SHUTTER IN A CAMERA EQUIPPED WITH A FOCAL PLANE SHUTTER AND POSSIBLY ALSO A CENTRAL SHUTTER

The present invention relates to a camera having embodied in the camera housing a focal plane shutter with associated selection means situated outside the housing and in which the lens is either securely attached to the camera housing and provided with a central shutter or is removable from the housing, wherewith it can be constructed both with or without a central shutter. The diaphragm, and in relevant instances the central shutter, in the lens are guided in relation to the mechanism in the camera housing by means of a dog or movement transmitting member, which when rotated, moved axially or caused to execute some other form of movement transmits the necessary movements for operating the camera.

When a camera is equipped both with a focal plane shutter and a central shutter, it is possible to select the shutter most suitable with respect to the shutter speed, the conditions of illumination and other circumstances, this shutter possibly being the only one possible under the then prevailing circumstances. The focal plane shutter must of necessity be used when relevant shutter speeds are shorter than those which can be achieved by using a central shutter, or in the case of cameras which permit the lens to be changed and it is desired to use a lens not equipped with a central shutter. The central shutter is more suitable when photographing with flash equipment, the burning time of which is short in relation to the running time of the focal plane shutter gap. In remaining instances the fields of use of the shutters overlap and either of the two types of shutter can be chosen when operating the camera. When taking an exposure using a central shutter it is necessary that the focal plane shutter opens before and closes after the central shutter. The reverse applies when exposing with a focal plane shutter, since the central shutter must then open before and close after the focal plane shutter. In other words the focal plane shutter must be released early or late in order to maintain a free beam path for the shutter used in the exposure.

Cameras of the aforedescribed type are previously known, but are accompanied with the disadvantage whereby the shutters are not coordinated and hence must be set individually by associated operating means. This restricts the utility of the camera for rapid use and under demanding conditions since the setting is easily forgotten in the haste of making the exposure and is complicated and time consuming, thereby increasing the risk of error and failure.

The aforementioned disadvantages are circumvented by means of the arrangement of the invention. The individual selection sequences are replaced with one single selector means which, by the introduction of an extra setting position "C" on the shutter speed selection means of the focal plane shutter, enables both the early or late release of the focal plane shutter and the shutter speed to be set solely by means of the shutter speed selection means on the focal plane shutter and, when applicable, the central shutter. The selector means, which permits rapid and positive settings, will be described in more detail in the following.

The selector means is electromechanical in function and is supplied from an electric battery embodied in the camera or from an external source. The arrangement includes two current circuits, one for an early release of the focal plane shutter and one for a delayed release of said shutter. When one of the circuits is closed, the focal plane shutter is released electromechanically. Each circuit embodies a contact which is closed with a time difference corresponding to the difference between early and delayed release of the focal plane shutter by actuation of a member which is moved by an impulse received either directly or indirectly from the dog or movement transmitting member and is guided by the movement which said dog member executes during the exposure.

The circuit for early release of the focal plane shutter must be broken to prevent an undesirable early release when photographing with a delayed release of the shutter. This circuit therefore includes a second contact in series with the contact controlled by the movement of the dog member. The second contact is actuated directly or indirectly by the shutter speed selection means of the focal plane shutter in a manner whereby it closes the current circuit in the extra setting position "C" and breaks the circuit in other setting positions.

When exposing with the central shutter, when the focal plane shutter is to be released early, the contact embodied in the early circuit and controlled by the shutter speed selection means of the focal plane shutter is closed by setting said circuit to position "C" and setting the shutter speed on the central shutter. When the camera is operated, the dog member begins to move immediately before the central shutter exposes the film. During this period, the current circuit for early release of the focal plane shutter is energized because the contact actuated by the dog member is closed, whereupon the focal plane shutter opens. The central shutter then exposes the film, and the focal plane shutter returns to its closed position. The focal plane shutter is held open for the requisite length of time, either by retaining the release means of the camera in an exposing position during this period, or as a result of providing the focal plane shutter with a delay means, the function of which is not concerned with the present invention. When the contact in the circuit adapted to delay release of the focal plane shutter is closed after further movement of the dog member, nothing will happen since the shutter is already released.

When exposing with the focal plane shutter, the shutter is set to the desired speed, whereby the circuit for early release of the focal plane shutter is broken since the contact guided by the shutter speed selection means of the focal plane shutter remains open in all setting positions other than "C." If the lens is provided with a central shutter, the shutter is set to "F," which is an extra setting position having a conventional "B-function" or, if this position is not embodied to "B." The central shutter will open as soon as the camera is operated, and remains open until the release member is released and returns to the original position. The focal plane shutter is released with a delay of the contact in the circuit for delayed release controlled by the movement of the dog member. If the lens has no central shutter, the camera functions as a conventional camera provided with a focal plane shutter.

Figure 2:
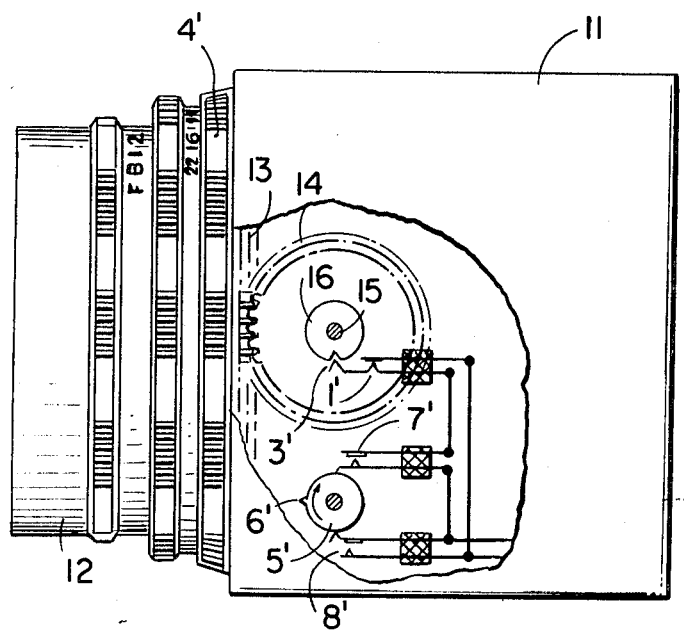
Figure 3:
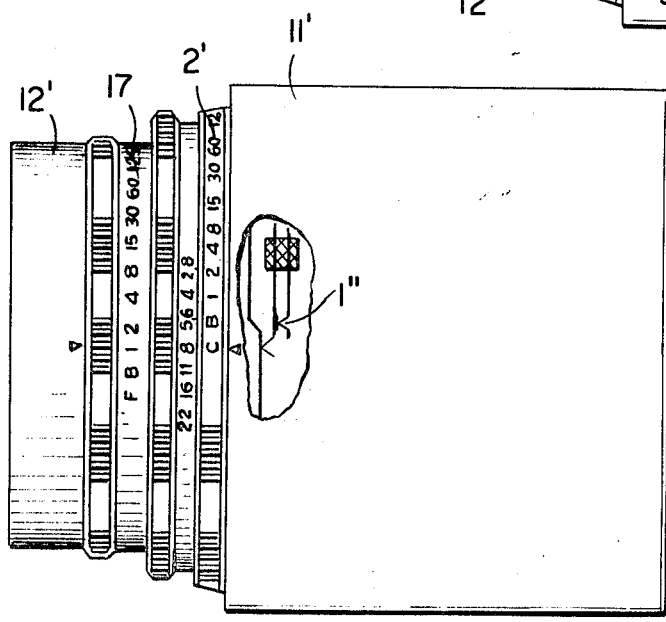

The invention will now be described with reference to two embodiments thereof illustrated in the accompanying drawing, in which FIG. 1 depicts the invention diagrammatically, FIG. 2 is a side view of a camera partly cut away and illustrate one manner in which the invention can be applied, and FIG. 3 shows the lens and the front portion of a camera seen in plan and partly cut away, illustrating another manner in which the invention can be applied.

In the exemplary embodiment shown diagrammatically in FIG. 1 a selector contact 1 is closed by a cam 3 when the shutter speed selection means 4 of the focal plane shutter is set to position "C" registered on a shutter speed scale 2, and is open in other setting positions, since it is not then actuated by the cam 3. The selector contact 1 is connected in series with a release contact 7, a release magnet 10 for the focal plane shutter and a source of current 9, which creates a circuit for early release of the focal plane shutter. In a second current circuit, intended for a delayed release of the focal plane shutter, is embodied a release contact 8 connected in series with the release magnet 10 and the power source 9. The release contacts 7 and 8 are closed during the exposure in the aforementioned sequence by a cam 6 rotated on a rotatable plate 5, which is operated either directly or indirectly through intermediate means by the dog member, which is caused to move during the exposure. The early release contact 7, the delayed release contact 8 and the plate 5 with the cam 6 are mutually so constructed and positioned that the release contacts 7 and 8 are closed at points of time which correspond to desired points of time for early and delayed release of the focal plane shutter.

The position illustrated in FIG. 1 of the selector contact 1, which is closed by the cam 3 since the shutter speed selection means of the focal plane shutter is set to "C," is intended for exposure with the central shutter, since it affords the desired early release of the focal plane shutter as the circuit for early release is energized when the release contact 7 is closed by the release cam 6 on the plate 5. The reverse is also true, insofar as the focal plane shutter is released with a delay when the selector contact 1 is open, i.e., when the focal plane shutter is set at any speed and the cam 3 does not actuate the selector contact 1.

This setting is used when exposing with the focal plane shutter which, when the circuit for early release of said shutter is open, can not be released before the release contact 8 is closed by the release cam 6 on the plate 5.

FIG. 2 illustrates one manner in which the invention can be applied, and shows in side elevation a view of a partially cutaway camera. The shutter speed selection means for the focal plane shutter is in the form of a shutter speed selection ring 4' arranged concentrically with the lens 12 and mounted on the front side of the camera housing 11. The shutter speed selection ring 4' has a crown-wheel shaped gear segment 13 which embraces at least the relevant setting positions. The gear segment 13 engages with a gear 14, on the shaft 15 of which a cam plate 16 having a selector cam 3' actuates the selector contact 1'. The release contacts 7' and 8' for early and delayed release of the focal plane shutter are closed by the cam 6' on the plate 5', which is driven by the dog member of a movement transmitting means (not shown). The switching diagram and the function thereof are the same as that illustrated in FIG. 1.

FIG. 3 illustrates a camera housing 11' and a lens 12' having a central shutter, seen in plan, in which the selector contact 1'' and the shutter speed selection means 4'' of the focal plane shutter are arranged in the same manner as that illustrated in FIG. 1 and the exemplary embodiment described in connection therewith. FIG. 3, which shows the shutter speed selection means on the respective shutters set for an exposure using the central shutter, illustrates how the position "C" on the time scale 2' for the focal plane shutter and the position "F" or "B" on the shutter speed scale 17 for the central shutter are positioned.

The design, size and orientation of the various elements embodied in the arrangement of the invention can be widely varied in order to adapt said elements to the individual camera model and its coacting parts, without trespassing beyond the scope of the invention. For instance, the contacts may be provided with cam guiding means, as shown in the examples, but may also be constructed as slip contacts, and the contact movement guided and caused by the dog member may occur directly or indirectly over intermediate means, whereupon the movement extracted for actuating the contacts may be a rotary movement, linear movement or any other form of movement suitable for the particular case in question.

What is claimed is:

1. An apparatus in a camera adapted for use with a first shutter, comprising a second shutter, shutter control means adapted to be connected to the first shutter and connected to said second shutter for releasing the shutters in sequence, and setting means in said control means and settable in two positions for constraining said shutter control means to release the shutters in one sequence when set in one position and in a second sequence when set in the second position.

2. An apparatus as in claim 1, wherein the first shutter is a central shutter and the second shutter is a curtain-type focal-plane shutter.

3. An apparatus as in claim 1, wherein said control means includes shutter actuating means for actuating the shutters, shutter release means intermediate said shutter actuating means and said second shutter, first operating means for operating said shutter release means when enabled and second operating means for operating said release means when enabled, sequencing means responsive to said actuating means for enabling said first operating means and then said second operating means in a sequence respectively before and after release of the first shutter, and disabling means connected to said setting means and said first operating means for disabling said first operating means when said setting means is in the one position and for enabling said first operating means when said setting means is in the other position.

4. An apparatus as is claim 1, wherein said setting means includes speed control means for setting the speeds of said second shutter means when said setting means is set in the position in which it releases the first shutter before said second shutter.

5. An apparatus as in claim 3, wherein the first shutter is a central and the second shutter is a curtain-type focal plane shutter.

6. An apparatus as in claim 3, wherein said setting means includes speed control means for setting the speeds of said second shutter means when said setting means is set in the position in which it releases the first shutter before said second shutter.

7. An apparatus as in claim 3, wherein said release means includes electrically operated switch means and a source of power, wherein said first operating means includes first circuit contact means for connecting said switch means to said source of power, and wherein said second operating means includes second circuit contact means for connecting said switch means to said source of power.

8. An apparatus as in claim 7, wherein said sequencing means includes a cam rotated by said actuating means for closing one and then the other of said contact means.

9. An apparatus as in claim 8, wherein said actuating means includes a shaft for rotating said cam.

10. An apparatus as in claim 7, wherein said disabling means includes an electric contact in series with said first contact means, and said setting means includes a cam surface for opening and closing said electrical contact.

11. An apparatus as in claim 7, wherein the first shutter is a central shutter and the second shutter is a curtain-type focal plane shutter.

12. An apparatus as is claim 7, wherein said setting means includes speed control means for setting the speeds of said second shutter means when said setting means is set in the one position in which it releases the first shutter before said second shutter.

13. An apparatus as in claim 10, wherein said setting means includes speed control means for setting the speeds of said second shutter means when said setting means is set in the position in which it releases the first shutter before said second shutter.

14. A camera, comprising a first shutter, a second shutter, shutter control means connected to said shutters for releasing the shutters in sequence, and setting means in said control means and settable in two positions for constraining said shutter control means to release the first shutter first and then said second shutter when set in one position and said second shutter and then said first shutter when set in the second position.

* * * * *